United States Patent
Lehr et al.

(10) Patent No.: US 8,787,856 B2
(45) Date of Patent: Jul. 22, 2014

(54) METHOD AND SYSTEM FOR RECEIVING RADIO STATIONS

(75) Inventors: Carsten Lehr, Hannover (DE); Detlev Nyenhuis, Sibbesse (DE); Marcus Risse, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/512,522

(22) PCT Filed: Oct. 22, 2010

(86) PCT No.: PCT/EP2010/065939
§ 371 (c)(1),
(2), (4) Date: Aug. 3, 2012

(87) PCT Pub. No.: WO2011/067034
PCT Pub. Date: Jun. 9, 2011

(65) Prior Publication Data
US 2012/0300880 A1 Nov. 29, 2012

(30) Foreign Application Priority Data
Dec. 2, 2009 (DE) .......................... 10 2009 047 388

(51) Int. Cl.
*H04B 1/18* (2006.01)

(52) U.S. Cl.
USPC ...................... 455/161.3; 455/135; 455/266.4; 455/323; 375/346

(58) Field of Classification Search
USPC ................... 455/131–135, 150, 161.1, 161.3, 455/226.1–226.4, 277.1, 277.2, 313, 323, 455/334, 337; 375/340, 346
See application file for complete search history.

(56) References Cited

U.S. PATENT DOCUMENTS

| 5,870,402 | A | 2/1999 | Kelley | |
|---|---|---|---|---|
| 6,334,051 | B1 | 12/2001 | Tsurumi et al. | |
| 7,515,893 | B2 * | 4/2009 | Lyons et al. | 455/277.2 |
| 8,290,492 | B2 * | 10/2012 | Lu et al. | 455/436 |
| 2007/0058741 | A1 * | 3/2007 | Inagawa | 375/260 |
| 2007/0275679 | A1 | 11/2007 | Gibson et al. | |
| 2009/0252204 | A1 * | 10/2009 | Shatara et al. | 375/216 |

FOREIGN PATENT DOCUMENTS

| DE | 197 51 189 | 5/1999 |
|---|---|---|
| DE | 103 15 408 | 10/2004 |
| DE | 698 37 941 | 2/2008 |
| DE | 10 2008 012 127 | 10/2008 |
| EP | 0 973 286 | 1/2000 |
| EP | 1 265 368 | 12/2002 |
| WO | WO 01/50648 | 7/2001 |
| WO | WO 2009/021247 | 2/2009 |

OTHER PUBLICATIONS

International Search Report for PCT/EP2010/065939, dated Jan. 31, 2011.

* cited by examiner

*Primary Examiner* — Nhan Le
(74) *Attorney, Agent, or Firm* — Kenyon & Kenyon LLP

(57) ABSTRACT

A system for receiving radio stations includes: at least one A/D converter in order to digitize the entire desired frequency band, for instance, an FM band, received via at least one antenna, and a demodulation unit for demodulating at least two signals of different transmitting frequencies of a radio station.

21 Claims, 1 Drawing Sheet

METHOD AND SYSTEM FOR RECEIVING RADIO STATIONS

BACKGROUND OF THE INVENTION

1. Field of the Invention

The present invention relates to a method and a system for receiving radio stations, including at least one A/D converter, in order to digitize the entire desired frequency band, such as the FM band, received over at least one antenna.

2. Description of the Related Art

In FM radio receivers used these days, tuner assemblies are included which are suitable for filtering the HF signal, incoming at the antenna of the radio, amplifying it and mixing it to a suitable intermediate frequency, such as 10.7 MHz. This is followed either by an analog demodulation of the signal or the signal is digitized using an A/D converter and then digitally demodulated.

Thus, it is known, for example, from U.S. Pat. No. 6,334,051 B1 and published international patent application document WO 2009/021247 A1, that one may convert two or more radio signals A/D and select the respective required signal.

One disadvantage of the tuner assemblies known from the related art is that, before the digitization of the signal, its bandwidth is greatly reduced, so that to receive two or more signals, that is, two or more stations, one has to use a complete receiver path made up of a tuner assembly and A/D converter per signal to be received, respectively.

However, these days, especially in car radios, frequently two or more receiver paths are required, so as, in particular, to implement in one car radio important and desired functions, such as reception improvement by diversity algorithms, background tuners for RDS reception, the monitoring of TMC transmitters, etc.

This means that at least two receiver paths, made up in each case of a tuner assembly and an A/D converter are required. This represents a constructional increased cost that is not desirable.

In new system proposals it is provided that the entire FM band be digitized with the aid of a broadband A/D converter, so as to have the entire band present in digital form. Such a proposal can be gathered from published German patent application document DE 10 2008 012 127 A1, for instance. From this Laid-Open document, the A/D conversion of a whole broadcastband, such as AM or FM is known.

Moreover, a broadband receiver and a channel sampling method in mobile broadcasting are known from published German patent application document DE 698 37 941 T2. In this case, the A/D conversion of an entire reception band takes place and the channels used within a band are searched for, so as then to detect one channel with great rapidity.

Starting from this, the present invention is based on the object of achieving even better reception of radio stations in a method and a system for receiving radio stations of the type named at the outset.

BRIEF SUMMARY OF THE INVENTION

Using a system and method according to the present invention, for receiving radio stations, using at least one A/D converter, the entire desired frequency band, such as an FM band, received via at least one antenna, is now digitized, and furthermore, means are provided for demodulating and also using at least two signals of different transmitting frequencies of a radio station.

By utilizing the entire receiving band, optimized reception of the radio station is now achieved. For this, the various receive channels of a radio station are used.

Normally, one is able to receive a radio program on several transmitting frequencies $f_1$ to $f_N$. The signals of these transmitting frequencies are able to be demodulated simultaneously in the digital signal processing unit, with the aid of a direct sampling system. Because of the combination of the signals of the various transmitting frequencies $f_1$ to $f_N$, an improved receive signal may be achieved, compared to the reception of only one transmitting frequency.

According to one preferred specific embodiment of the present invention, the receiving quality of the signals of different transmitting frequencies is evaluated, and in each case the signal is selected that was valued better.

In the process, it may be provided that the evaluation of the receiving quality takes place constantly and, if necessary, switching takes place to another signal. Constantly, in this case, does not mean that the evaluation necessarily has to take place in an uninterrupted manner. One should rather understand from the specific embodiment described that the evaluation at least takes place repeatedly, and not only once. This is of advantage particularly for car radios, because in this instance, because of the constant change of location, the quality of the individual signals also changes continuously. One may also say that the evaluation of the quality of the signal is time-dependent, and may be composed, for example, of the field intensity and other signal quality indicators.

The switching over between signals of different transmitting frequencies is also able to take place directly, according to one specific embodiment.

However, it may definitely be of advantage if the switching over takes place by cross-fading the two signals.

According to a further preferred specific embodiment of the present invention, at least two or even more signals of different transmitting frequencies of a radio station are combined with one another to form a signal. An improved receive signal may be received in this way.

In this context, it may be provided, according to one preferred specific embodiment, that the combined signals are weighted differently. This is able to lead to a still better radio reception.

The weighting of the signals may again be time-dependent in this case too, and be based on the evaluation of the quality of reception, for instance, by evaluating the field intensity and/or the quality of the signals.

Over and above that, it is also conceivable to switch over among various combined signals.

According to one preferred specific embodiment of the present invention, the combination of the signals of different transmitting frequencies takes place before the demodulation. But it is definitely also possible that the combination of the signals takes place after the demodulation.

Moreover, the combination of the signals of different transmitting frequencies may be even further improved if the signals are synchronized in time. Such a synchronization may be calculated, for example, by correlation methods.

Furthermore, the combination of the signals of different transmitting frequencies may be even further improved if an adjustment of the amplitudes of the signals, for instance, of the swing of the signals is carried out after the demodulation.

It should be emphasized at this point, that the present invention described is not restricted to the use of an A/D converter and an antenna, but that it may be extended to systems having a plurality of antennas and/or a plurality of A/D converters. Thus, the signals, to be combined, of the various transmitting frequencies of a radio program may also be received via different antennas, and if necessary, may be digitized via different A/D converters.

The present invention also includes a computer program product, which has program parts for carrying out a method according to the present invention.

Moreover, the present invention also includes a machine-readable, especially computer-readable data structure, produced by a method according to the present invention and/or by at least one computer program product according to the present invention.

Furthermore, a machine-readable, especially a computer-readable data carrier, on which at least one computer program product according to the present invention is recorded and/or stored and/or on which at least one data structure according to the present invention is maintained, is also included in the present invention.

DETAILED DESCRIPTION OF THE INVENTION

Figure 1:
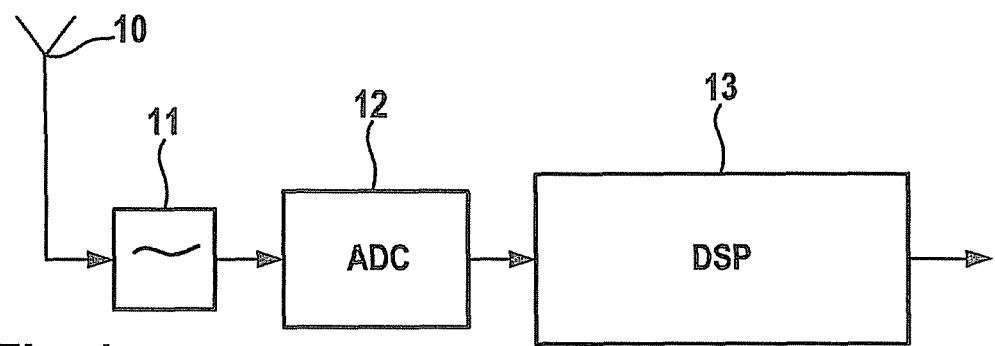
FIG. 1 shows the direct sampling of a frequency range according to a specific embodiment of the present invention.

In an exemplary manner, FIG. 1 shows a system for the direct sampling of the entire FM band of a car radio receiver. The system includes an antenna 10, an HF preselector stage 11, an A/D converter 12 and a digital signal processing unit 13. HF preselector stage 11 includes, for instance, a band filter, in this context, possibly an amplifier and an AGC. Digital signal processing unit 13 may be a DSP, in this instance, and in it, as a function of the available calculating power, any desired number of channels of a radio station are able to be demodulated.

Figure 2:
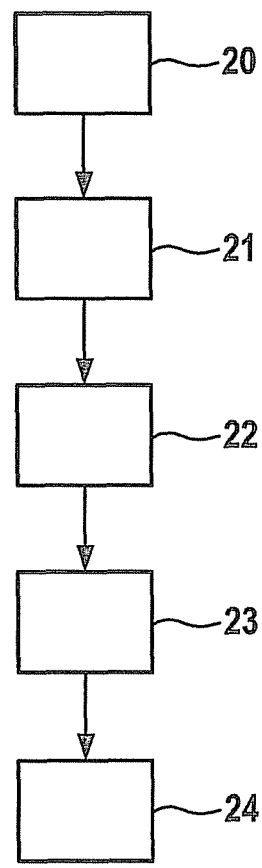
FIG. 2 shows a flow chart of a method of the present invention according to a preferred specific embodiment.

The flow chart of FIG. 2 shows a method for receiving radio stations according to a particularly preferred specific embodiment.

In FIG. 2 one may infer that first a frequency band is received 20, for instance, by an antenna. In an additional step, this received frequency band is then filtered using an HF preselector stage and perhaps amplified 21. The entire frequency band is then digitized 22 with the aid of a broadband A/D converter. In an additional step, at least two signals of different transmitting frequencies of a radio station are demodulated 23 and subsequently combined 24.

Figure 3:
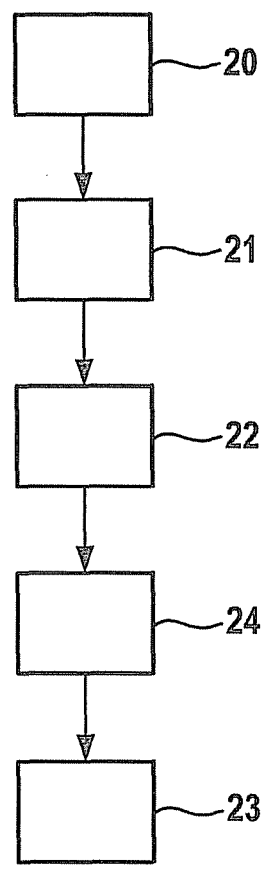
FIG. 3 shows a flow chart of a method of the present invention, according to an additional preferred specific embodiment.

According to the specific embodiment of the present invention shown in FIG. 3, again a frequency band is first received 20 via an antenna, for example. In an additional step, this received frequency band is then filtered using an HF preselector stage and perhaps amplified 21. The entire frequency band is then digitized 22 with the aid of a broadband A/D converter. In an additional step, at least two signals of different transmitting frequencies of a radio station are combined 24 and subsequently demodulated 23.

What is claimed is:

1. A system for receiving radio transmissions from an FM radio station, comprising:
   at least one A/D converter to digitize an entire FM frequency band received via at least one antenna to produce a plurality of signals of different transmitting frequencies of the FM radio station; and
   a digital signal processing unit for subsequently:
      evaluating a reception quality of the plurality of signals of different transmitting frequencies of the FM radio station;
      selecting at least two signals of different transmitting frequencies of the FM radio station based on the evaluating;
      demodulating the at least two signals of different transmitting frequencies of the FM radio station; and
      combining the at least two signals of different transmitting frequencies of the FM radio station.

2. The system of claim 1, wherein the digital signal processing unit simultaneously demodulates the at least two signals of different transmitting frequencies of the radio station to produce at least two respective demodulated signals, and combines the at least two respective demodulated signals.

3. The system of claim 1, wherein the evaluating of the reception quality of the plurality of signals of different transmitting frequencies of the FM radio station takes place repeatedly, and a different at least two signals of different transmitting frequencies of the FM radio station are subsequently selected and combined in response to the repeated evaluating.

4. The system of claim 1, wherein the at least one antenna is a single antenna.

5. A method for receiving radio transmissions from an FM radio station, comprising:
   digitizing, using at least one A/D converter, an entire FM frequency band received via at least one antenna;
   subsequently, using a digital signal processing unit:
      evaluating a reception quality of a plurality of signals of different transmitting frequencies of the FM radio station;
      selecting at least two signals of different transmitting frequencies of the FM radio station based on the evaluating;
      demodulating the at least two signals of different transmitting frequencies of the FM radio station; and
      combining the at least two signals of different transmitting frequencies of the FM radio station.

6. The method as recited in claim 5, wherein higher quality signals are selected.

7. The method as recited in claim 6, wherein the evaluation of the reception quality takes place repeatedly, and wherein a switchover to another signal is performed depending on the reception quality of an evaluated signal.

8. The method as recited in claim 7, wherein the switchover to another signal takes place directly.

9. The method as recited in claim 5, wherein the at least two signals are weighted differently in the combination.

10. The method as recited in claim 5, wherein the combination takes place one of before or after the demodulation.

11. The method as recited in claim 10, wherein the at least two signals are synchronized in time.

12. The method as recited in claim 10, wherein the amplitudes of the at least two signals are adjusted.

13. The method of claim 5, wherein the demodulating includes simultaneously demodulating the at least two signals of different transmitting frequencies of the radio station to produce at least two respective demodulated signals, and the combining includes combining the at least two respective demodulated signals.

14. The method of claim 5, wherein the evaluating of the reception quality of the plurality of signals of different transmitting frequencies of the FM radio station takes place repeatedly, and a different at least two signals of different transmitting frequencies of the FM radio station are subsequently selected and combined in response to the repeated evaluating.

15. The method of claim 5, wherein the at least one antenna is a single antenna.

16. A method for receiving radio transmissions from a radio station, the method comprising:
digitizing, using at least one A/D converter, an entire desired frequency band received via at least one antenna;
subsequently, using a digital signal processing unit:
repeatedly evaluating a reception quality of each of a plurality of signals of different transmitting frequencies and selecting higher quality signals;
demodulating at least two signals of the different transmitting frequencies of the radio station;
combining the at least two signals; and
depending on the reception quality of one of the evaluated signals, performing a switchover to another signal by cross-fading the two signals.

17. A non-transitory computer-readable data storage medium storing a computer program having program codes which, when executed on a computer, perform a method for receiving radio transmissions from an FM radio station, the method comprising:
digitizing, using at least one A/D converter, an entire FM frequency band received via at least one antenna to produce a plurality of signals of different transmitting frequencies of the FM radio station; and
subsequently, using a digital signal processing unit:
evaluating a reception quality of the plurality of signals of different transmitting frequencies of the FM radio station;
selecting at least two signals of different transmitting frequencies of the FM radio station based on the evaluating;
demodulating the at least two signals of different transmitting frequencies of the FM radio station; and
combining the at least two signals of different transmitting frequencies of the FM radio station.

18. The non-transitory computer-readable storage medium of claim 17, wherein the demodulating includes simultaneously demodulating the at least two signals of different transmitting frequencies of the radio station to produce at least two respective demodulated signals, and the combining includes combining the at least two respective demodulated signals.

19. The non-transitory computer-readable storage medium of claim 17, wherein the evaluating of the reception quality of the plurality of signals of different transmitting frequencies of the FM radio station takes place repeatedly, and a different at least two signals of different transmitting frequencies of the FM radio station are subsequently selected and combined in response to the repeated evaluating.

20. The non-transitory computer-readable storage medium of claim 17, wherein the at least one antenna is a single antenna.

21. A system for receiving radio transmissions from a radio station, comprising:
at least one A/D converter configured to digitize an entire desired frequency band received via at least one antenna to produce a plurality of signals of different transmitting frequencies; and
a digital signal processing unit configured to subsequently:
repeatedly evaluate a reception quality of each of the plurality of signals of different transmitting frequencies and select higher quality signals;
demodulate at least two signals of the different transmitting frequencies of the radio station;
combine the at least two signals; and
depending on the reception quality of one of the evaluated signals, perform a switchover to another signal by cross-fading the two signals.

* * * * *